Patented July 27, 1943

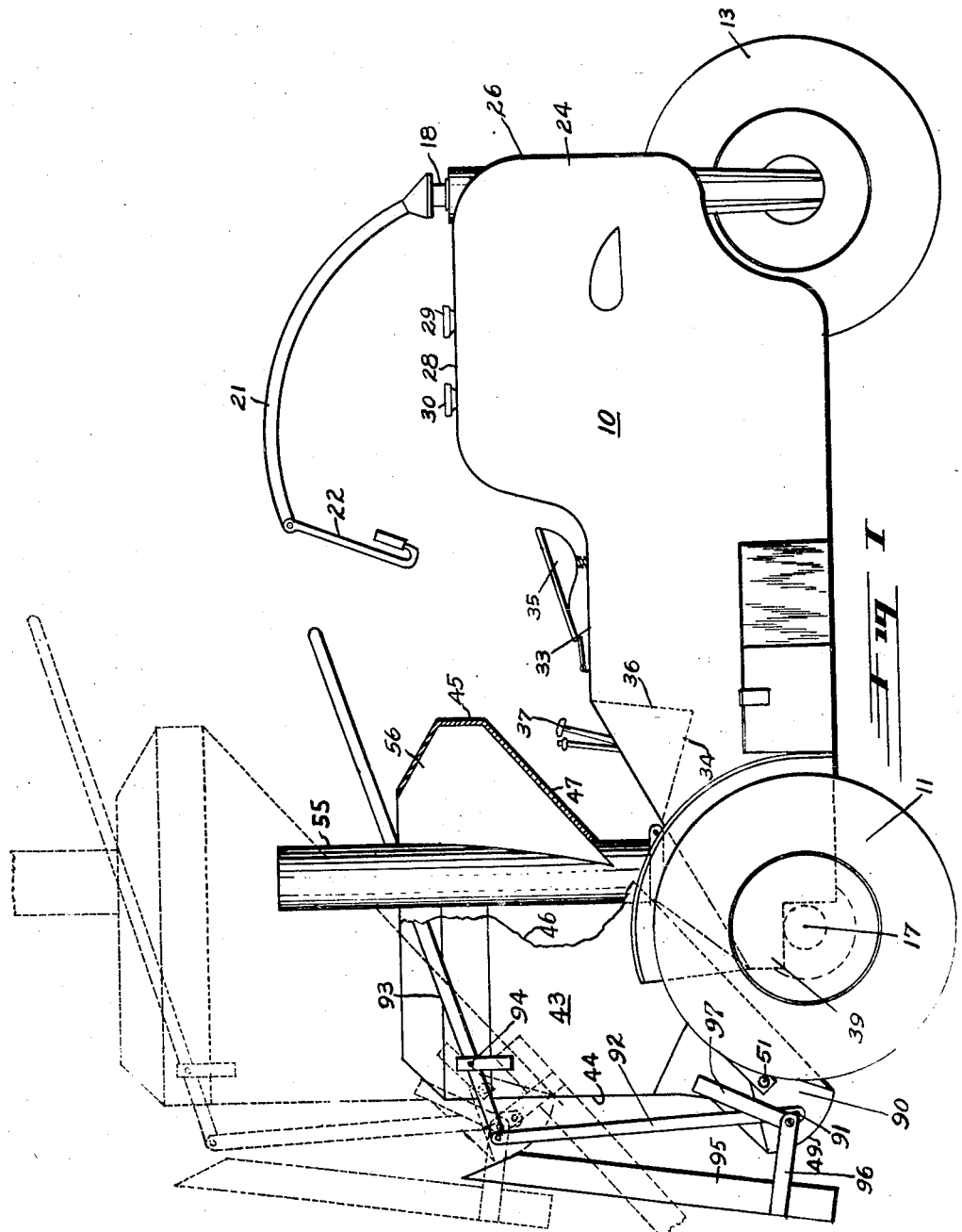

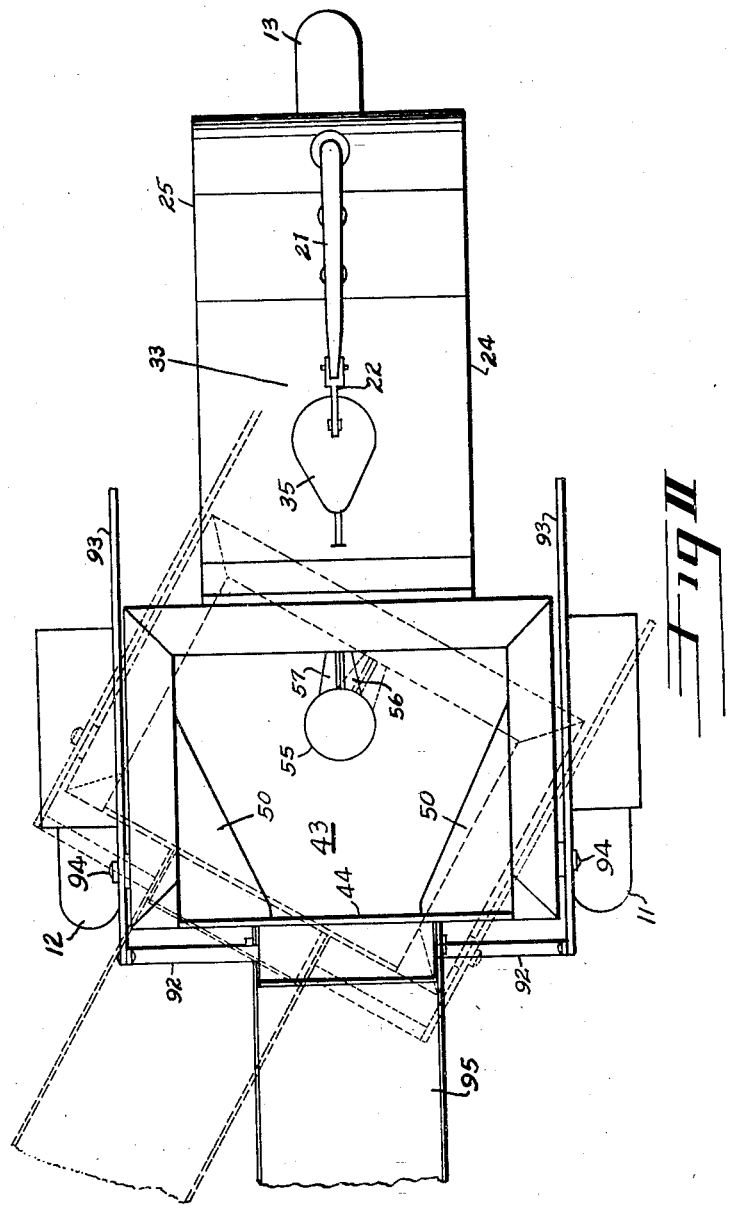

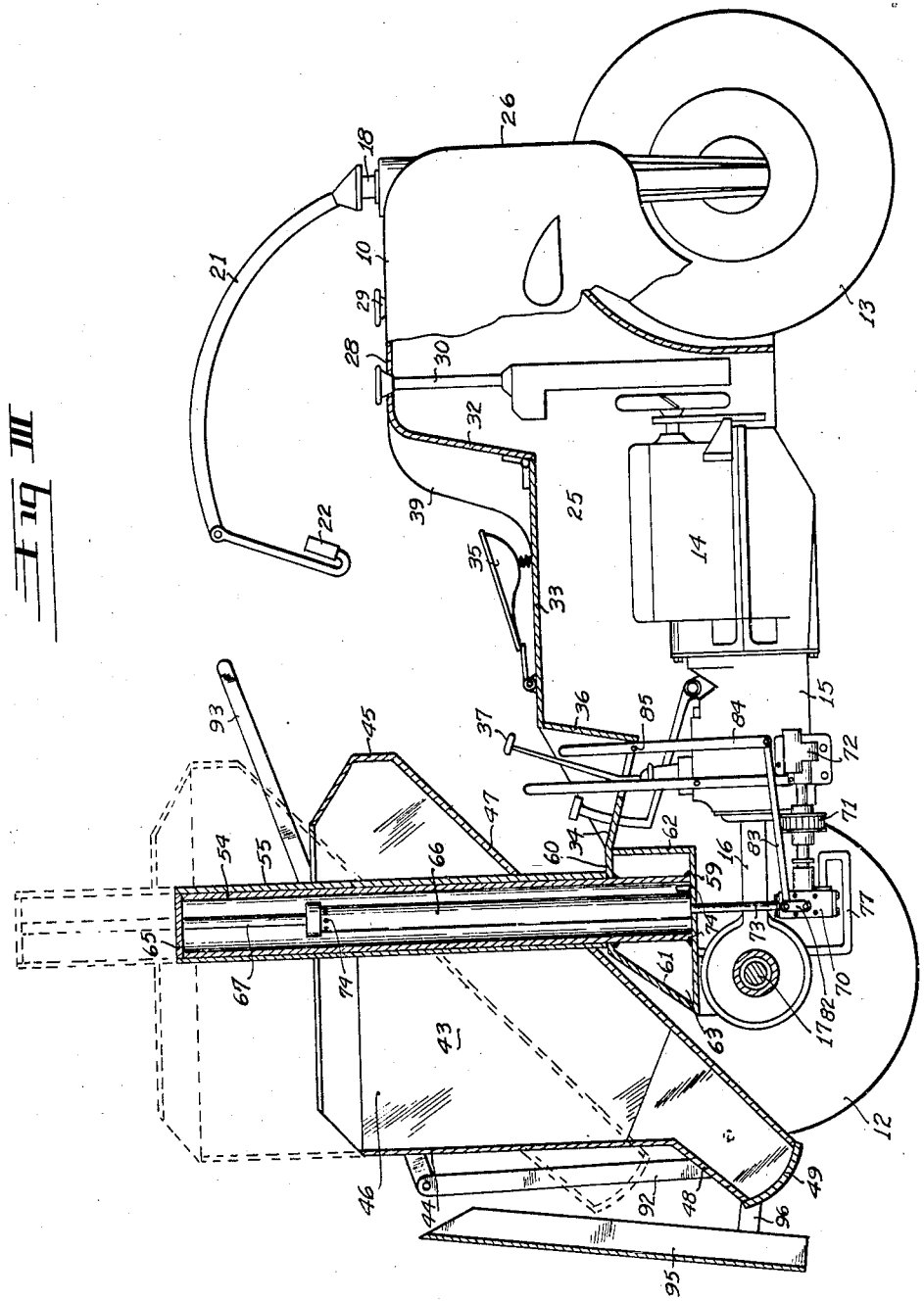

2,325,445

UNITED STATES PATENT OFFICE 2,325,445

MATERIAL HANDLING TRUCK

Elmer A. Wagner, Portland, Oreg.

Application May 13, 1941, Serial No. 393,238

24 Claims. (Cl. 214—117)

This invention relates to trucks, and has for a general object the provision of a compact load handling vehicle having a high degree of maneuverability and stability whereby it is suitable for operation within close quarters and over rough surfaces.

A further object of the invention is to provide a truck having thereon a new and novel arrangement of load handling means.

A more specific object of the invention is to provide a new and improved truck having a bulk material handling hopper mounted on one end thereof in such a manner that it may readily be filled and, after it has been transported to the desired location, be unloaded quickly and efficiently.

A still further object of the invention is to provide a new and improved light weight truck having a load material handling hopper mounted on one end thereof in such manner that when fully loaded the vehicle will not be top heavy nor unduly unbalanced toward the hopper end.

In accordance with the illustrated embodiment, the truck comprises a frame having a motor mounted therein connected to a pair of supporting wheels arranged at the forward end of the frame. A single guiding wheel is provided at the opposite end of the frame. A bulk material handling hopper is mounted over the forward end of the truck body by means including a pair of telescopic upright members which extend through the interior of the hopper, the inner one of the upright members being rigidly secured at the lower end thereof to the truck body while the hopper is rigidly secured to the outer one of the uprights. A suitable elevating mechanism is provided within the uprights for effecting vertical movement of the outer upright and, accordingly, of the hopper. The bottom of the hopper slopes forwardly and downwardly, the lowermost portion of the hopper depending between the spaced wheels. In the lowered position of the hopper the sloping bottom thereof overlies closely adjacent the forward end of the truck body which is similarly tapered so that the center of gravity of the loaded hopper is maintained low and is arranged substantially above the axle of the front wheels. In the elevated position of the hopper it may be rotated about the axis of the telescopic uprights in which position the pouring spout clears the front wheels and, in order to further facilitate the delivery of the hopper contents to the proper point, a chute is provided by which, when moved into cooperative relation with respect to the pouring spout, the flow of the hopper contents may be properly directed.

Additional objects and advantages of the truck of the invention will appear from the following description, taken in connection with the accompanying drawings, while the features of novelty will be pointed out with greater particularity in the appended claims.

In the drawings, Figure 1 is a side elevation of the truck constructed in accordance with one form of the invention, certain portions thereof being broken away for more clearly illustrating certain details; Figure 2 is a plan view of the truck shown in Figure 1 with the delivery chute lowered; and Figure 3 is a partial longitudinal cross sectional view of the truck.

The truck of the invention is of a relatively small size, that is, having a short over-all length and wheel base, a narrow width and low height, and also having a short turning radius. It is specifically so proportioned and designed that it may be maneuvered readily within close quarters and below low overhead clearances. The truck modification shown is particularly adapted for handling concrete, that is, for picking up loads of concrete from a mixer and delivering such loads to nearby locations and pouring the concrete into previously prepared forms. It will readily be understood that around the ordinary construction site, scaffolding, form supports, and other equipment seriously limit the working area so that the truck must be compact in order to be operable amid such surroundings. As illustrated, the truck comprises a body 10 supported at the forward end upon a pair of laterally spaced drive wheels 11 and 12 and at the rear by a single guiding wheel 13. These wheels are of a relatively large diameter as compared with the small size of the body, in order that the truck may be driven over rough ground surfaces such as usually prevail in the vicinity of concrete laying operations. The wheels are preferably equipped with pneumatic tires to further facilitate travel over loose or soggy earth.

A motor 14 suitably mounted in the truck body 10 is connected by transmission 15 and drive shaft 16 to the axle 17 for driving the front wheels 11 and 12. The rear wheel 13 may be mounted on the rear end of the body 10 by post 18 for pivotal movement about a vertical axis. A tiller arm 21 is connected to the upper end of post 18, having a pivoted extension 22 on the end thereof forming a convenient handle for effecting steering manipulation of wheel 13. The truck body 10 is formed in part by relatively heavy side plates 24 and 25 extending the length thereof and a back plate 26 extending between the rear ends of the side plates and curved upwardly over the upper corners thereof. A top plate 28 connects the upper edges of the rear portions of the side plates, openings being provided therethrough for cooperatively receiving filling pipes 29 and 30 for the fuel tank and radiator, respectively, which may conveniently be arranged therebeneath.

A space for an operator is provided on the truck body defined by a downwardly sloping back plate 32, a horizontal seat plate 33, and a floor plate 34. The plate 33 may be suitably hinged to the back plate 32 so that it may be lifted to provide ready access to the motor 14 mounted therebeneath. A cushion seat 35 for the operator may be mounted on the upper surface of the plate 33. Various instrument accessories may be mounted on the instrument panel 36 extending downwardly between the seat plate 33 and floor plate 34. Extending upwardly through cooperating openings in the floor plate 34 are the various truck control levers including the transmission gear shift lever 37. The opposite side plates 24 and 25 are provided at their forward ends with projecting portions 39 which in turn are suitably mounted upon the axle structure extending between the front supporting wheels 11 and 12.

Mounted upon the front end of the truck is a load handling means 43 shown in the form of a bulk material handling hopper comprising a front wall 44, a rear wall 45, opposite side walls 46, and a bottom wall 47. The hopper 43 is mounted on the forward end of the truck in an overlying relation with respect to the truck body so that the center of the hopper is substantially directly above the front axle and the forward wall of the hopper substantially even with the foremost portions of the wheels 11 and 12. In order to maintain the over all height of the truck at a minimum so that the truck may be driven about under restricted clearances, and, further, so that the hopper may readily be filled by positioning the open upper end thereof under the discharge spoon of a conventional mixer, the truck body is tapered downwardly from the rear to the front end and the hopper mounted closely thereabove. The bottom wall 47 of the hopper slopes downwardly and forwardly so that in the lowered position of the hopper the lower surface thereof conforms generally with the sloping forward end of the truck body. The forward lower end of the hopper is provided with a pouring spout defined in part by a lower extension of the bottom wall 47 and a cooperating portion 48 secured to the forward wall 44 extending outwardly therefrom and generally parallel with the extension of the bottom wall. The lower ends 50 of the opposite side walls 46 taper downwardly toward the spout. A suitable closure means in the form of a gate plate 49 is pivotally attached as at 51 to the opposite side walls of the hopper portions defining the pouring spout. The sloping bottom of the hopper facilitates the unloading thereof upon opening of the gate 49 by permitting the contents to flow freely under force of gravity without necessitating any tilting of the hopper. Depending, of course, upon the desired capacity of the hopper, the upper end portion thereof need extend only very slightly higher than the remaining portions of the truck body, while the main portion of the hopper is on a level with the body and the lowermost portion thereof depends downwardly between the wheels 11 and 12 to a point substantially on the level with the axle or the bottom of the vehicle body. Thus a sufficient clearance exists underneath the vehicle to permit it to pass freely over relatively high centers in the ground surface. With this arrangement of the hopper, in which substantially half of the cubical capacity of the hopper is positioned rearwardly of the front axle, the center of gravity of the hopper, when filled, will be positioned sufficiently toward the rear end of the vehicle so that the weight will not exert a turning moment of force about the front axle tending to raise the rear wheel off the ground. The center of gravity of the loaded hopper will, furthermore, be relatively low so that the vehicle, even when loaded, will not be top heavy and will remain stable even when driven over very uneven surfaces. The width of the hopper is substantially equal to the spacing between the front wheels, further contributing to the compactness of the vehicle.

In the lowered position of the hopper the mouth of the pouring spout is relatively close to the ground which is suitable when laying pavement, sidewalks, or the like. For pouring concrete into forms, such as for curbs or foundations, it may be desirable to provide means for elevating the hopper to a certain extent. The hopper mounting arrangement as illustrated comprises a pair of upright telescopic members 54 and 55 which are preferably in the form of cylindrical tubes. The inner tube 54 is firmly anchored at the lower end thereof somewhat back of the axle 17 to a transverse section of the frame, while the outer tube 55, which is freely slidable over the inner tube 54, extends through a cooperating opening in the bottom plate 47 of the hopper and is welded thereto around the opening. For bracing the upper end of the hopper 43 to the outer tube 55, a pair of plates 56 and 57 are provided extending between the rear wall 45, the upper portion of the bottom wall 47, and the adjacent surface of the outer tube 55. The plates 56 and 57 are preferably welded in position and diverge from each other at their lower ends so as not to form pockets behind the tube 55 within which material carried within the hopper might lodge.

The anchoring means for the lower end of the inner upright 54 comprises a box-like frame element including a bottom plate 59, a top plate 60, a sloping forward plate 61, a rear plate 62, and opposite end plates 63. This frame element is rigidly secured at its opposite ends to the remainder of the vehicle frame such as the opposite side plates 24 and 25 to impart a high degree of rigidity thereto. The tube 54 extends downwardly through a cooperating opening in the top plate 60 and rests upon the bottom plate 59 to which it is secured as by welding. The tube 54 is securely welded to the top plate 60 continuously therearound so that the chamber defined by the box-like frame element is substantially fluid tight. The lowermost end of the outer upright, or tube 55, in the lowered position, is adapted to rest upon the upper surface of the top plate 60 which forms a firm support therefor. The bottom wall 47 of the hopper 43 is welded to the outer tube 55 adjacent the lowermost end thereof in order that the lower wall of the hopper will lie as close as possible to the upper sloping surface of the forward end of the vehicle body.

The telescopic tubes 54 and 55 extend upwardly through the hopper 43 substantially coextensively with each other at their upper ends and may be of any suitable length according to the particular application for which the truck is designed. For handling concrete on the ordinary construction project, it is usually not necessary that provision be made for elevating the load to any great height, it being generally more desirable that the over-all height of the vehicle be maintained at a minimum. If it is desired to pour concrete into wall forms as in the case of building construction, it generally is expedient to provide a ramp leading up to the various floor levels and up which the truck may readily be driven to pour the concrete into the forms from above. As shown in the drawings, the telescopic members 54 and 55 project slightly beyond the open upper end of the hopper 43, but this projection does not interfere with the loading of the hopper as from a mixer. A relatively heavy cap plate 65 is welded over the upper end of the outer tube 55 forming a substantial seal precluding material which is being dumped into the hopper 43 from entering into the interior of the tubes. The telescopic tubes act primarily as guides for the vertical movement of the load handling means and hence are preferably of relatively large diameter so as to provide adequate cooperating bearing surfaces. Since the tubes extend upwardly through the interior of the hopper substantially centrally thereof as regards the width of the hopper, the weight of the load is distributed around the tubes so as to minimize side thrust and consequent high frictional resistance between the bearing surfaces during elevating movements. For effecting an exactly uniform distribution of weight the telescopic tubes should extend upwardly through the hopper through the center of gravity thereof, taking into consideration the particular configuration of the hopper. Other considerations pertaining to the particular modification herein described make it more feasible to move the tubes slightly off-center rearwardly as regards the true center of gravity of the hopper. Among such considerations, for example, is the desirability for having a considerable space between the upright tubes and the forward wall 44 of the hopper so as better to facilitate the loading thereof from the concrete mixer. It is also necessary that the lower end of the inner tube 54 be adequately anchored to the vehicle frame and, because of the fact that the driving shaft from the motor also extends centrally of the horizontal longitudinal axis of the truck, the frame element supporting the lower end of the tube 54 must inherently be arranged above the drive shaft as well as above the axle 17. This in turn necessitates that the frame member be arranged somewhat to the rear of the axle 17 in order to permit the hopper in the lowermost position to be carried relatively closely to the axle and thereby to maintain the center of gravity of the hopper as low as possible. The arrangement shown, therefore, represents a compromise condition. While the load is slightly unbalanced in the forward direction as regards the tubular uprights, the relation of the uprights as regards both the position of anchorage on the vehicle frame and the hopper, the center of gravity of the cubical capacity of the hopper is substantially directly above the front axle 17 so as not to exert a forward turning moment about the axle 17.

Means are provided for effecting elevation of the outer tube 55 and hence also of the hopper 43, and which may be of any suitable type. In the specific arrangement shown, a hydraulic servo-motor 66 is arranged within the inner cylinder 54, the lower end of the servo-motor cylinder being suitably secured to the lower plate 59 of the frame structure, while the upper end of the servo-motor piston rod 67 may either be connected to or adapted to engage with the closure plate 65 of the outer tube 55 for effecting the lifting movement.

Operating fluid is adapted to be supplied to the servo-motor 66 by means of a pump 70 driven through a suitable coupling 71 from the power take-off device 72 provided on the motor 14. The pump 70 is connected by conduit 73 for discharging fluid under pressure into the cylinder of the servo-motor 66. A plurality of openings 74 are provided in the upper end of the servo-motor cylinder forming escape passages for operating fluid supplied to the servo-motor upon the piston attached to the lower end of the rod 67 reaching its upper limit of travel. The servo-motor 66 is spaced somewhat from the adjacent inner side walls of the inner tube 54 so that fluid escaping through the openings 74 may flow freely downwardly. The lower end of the inner tube 54 is provided with a plurality of openings 75 to permit fluid to pass from the interior of the inner tube into the chamber defined by the box-like frame structure which forms a sump for the operating fluid. Conduit 77 is connected between the sump chamber and the intake for the pump 70.

Any suitable control means may be provided for the pump 70 and for the power take-off device 72. As shown, a lever 78 pivoted as at 79 is connected at its lower end to the power take-off control shaft 80. By depressing the clutch pedal 81 and moving the upper end of lever 78 rearwardly, the power take-off is engaged to place the pump 70 in operation. The pump 70 is provided with valve control lever 82 which is connected by link 83 to the lower end of an operating lever 84 pivoted as at 85. After the pump has been placed in operation by the engagement of the power take-off device 72, the lever 84 may be shifted so as to adjust the control valve for the pump 70 to such a position that oil will be pumped into the cylinder of the servo-motor 66. The elevation of the hopper will continue until the piston of the servo-motor reaches its upper limit of travel, whereupon operating fluid will be by-passed through openings 74 in the upper end of the servo-motor cylinder and which operating fluid will then be returned to the sump chamber.

To arrest the elevation of the hopper at any point less than its upper limit position, the clutch may be disengaged, thereby discontinuing the operation of the pump 70. A suitable check valve, not shown, provided in the pump 70 prevents the oil from returning from the servo-motor cylinder back through the pump and into the sump chamber. If the operator desires to leave his position on the truck and wishes that the hopper be retained at the particular height to which it has been raised, the lever 84 may be so adjusted as to cause the oil output of the pump to be by-passed with none being supplied to the cylinder of the servo-motor 66. To lower the hopper 43, the pump control valve is so adjusted by lever 84 that oil is permitted to flow through the pump 70 and through pipe 77 back into the sump chamber.

It may here be noted that the operation of the hopper elevating mechanism is entirely independent of the operation of the remainder of the vehicle. Thus the vehicle may be in motion while the hopper is being raised, and conversely, the hopper may be lowered, following a dumping operation, while the truck is returning to the source of supply for a new load.

The gate plate 49 normally covering the mouth of the pouring spout is adapted for control by the truck operator while he is seated on the truck. The gate plate 49 is provided with end flanges 90 which are pivotally attached as at 51 to the adjacent side walls of the pouring spout. Connected to the flanges 90 as at 91 are links 92, the opposite ends of which are pivotally secured to the ends of operating levers 93 which are mounted to the upper ends of the hopper side walls as at 94. The rear ends of levers 93 extend toward the driver's space on the truck for convenient manipulation.

With the elevating mechanism as described, the hopper may be raised to a desired height for pouring concrete into box forms and the like which may extend above the surface of the ground. Frequently it is not possible to drive the truck right up to the side wall of the form because of a trench which may be next adjacent thereto or because of projecting structural members of the form. A chute 95 is pivotally connected by means of lever arms 96 to bracket arms 97 which are attached to the hopper so as not to interfere with the control of the spout gate 49. In the elevated position of the chute, the lower end thereof is spaced sufficiently from the mouth of the pouring spout so as not to interfere with the pouring of material therefrom when it may be desired so to do. When the hopper is elevated to the position shown in dotted lines in Figure 1 and the chute lowered, the material may be directed thereby to the desired point.

It may not be convenient nor possible in all instances to approach the concrete form squarely head-on. Accordingly, it is desirable that the hopper be capable of unloading sidewise of the truck. With the uprights 54 and 55 being of cylindrical configuration, the outer tube 55, and hence the hopper, is rotatable about the vertical axis of the upright structure when in the elevated condition. When the hopper is elevated, it may be swung around clear of the top of the wheels 11 and 12 while the hopper contents may be directed into the desired form by means of the lowered chute 95. The hopper may be swung by pulling sidewise on the ends of levers 93. Since levers are provided on each of the opposite sides of the hopper, the spout control gate 49 may be operated from the driver's seat irrespective of the rotated condition of the hopper about its supporting uprights.

Having described the principles of the invention in what is considered to be a preferred embodiment thereof, it is desired that it be understood that the specific details shown are merely illustrative, and that the invention may be carried out by other means.

What I claim is:

1. A truck having a frame, a tubular upright member secured at the lower end thereof to one end of said frame, a second tubular member telescopically surrounding said first tubular member, a bulk material hopper secured to said outer tubular member, said outer tubular member extending upwardly through said hopper, and means arranged within said first tubular member for exerting a pressure against the upper end of said outer tubular member for effecting elevation of said hopper.

2. A truck comprising a frame, a tubular upright member secured at the lower end thereof to one end of said frame, an outer tubular member arranged telescopically around said first tubular member and movable longitudinally with respect thereto, a bulk material handling hopper, said outer tubular member extending upwardly through said hopper substantially centrally disposed as regards the width of said hopper, the lower wall of said hopper being rigidly secured to said outer tubular member, and means connecting an upper wall portion of said hopper and an adjacent portion of said outer tubular member.

3. A truck comprising a frame, a tubular upright member secured at the lower end thereof to one end of said frame, an outer tubular member arranged telescopically around said first tubular member, means arranged within said first tubular member for effecting upward telescopic movement of said outer tube, a bulk material handling hopper, said tubular members extending upwardly through the interior of said hopper substantially centrally thereof as regards the width thereof, said hopper being rigidly secured to said outer tube for movement therewith, the bottom of said hopper being inclined at an angle, an opening in the lower portion of said hopper adjacent said inclined bottom, closure means for said opening, and means for operating said closure means.

4. A truck comprising a frame, a tubular upright member secured at the lower end to one end of said frame, an outer tubular member arranged telescopically around said first tubular member, means arranged within said first tubular member for effecting upward telescopic movement of said outer tubular member, a bulk material handling hopper, said tubular members extending upwardly through the interior of said hopper, said hopper being rigidly secured to said outer tubular member, the bottom wall of said hopper being inclined at an angle, an opening in said hopper adjacent the lowermost portion thereof, closure means for said opening, lever means for operating said closure means, said lever means being operable from a position on said truck either for opening said closure means or for rotating said hopper about said first tubular member.

5. A truck comprising a frame, a pair of spaced apart supporting wheels on one end of said frame, a tubular upright member secured at one end to said frame between said wheels, an outer tubular member arranged telescopically around said first tubular member, means arranged within said first tubular member for effecting elevation of said outer tubular member, a bulk material handling hopper, said tubular members extending upwardly through the interior of said hopper, said hopper being rigidly secured to said outer tubular member for movement therewith, said hopper in the lowered position extending between said wheels, a pouring spout on the lowermost end of said hopper, said hopper being rotatable about said inner tubular member in the elevated position thereof, said spout clearing said wheels in the elevated position of said hopper.

6. A truck comprising a frame, a pair of supporting wheels at one end of said frame, an axle extending between said wheels, a tubular upright member secured at the lower end thereof to said frame between said wheels and inwardly of the truck relative to said axle, an outer tubular member arranged telescopically over said first tubular member, means arranged within said inner tubular member for effecting upward telescopic movement of said outer tubular member, a bulk material handling hopper, said tubular members extending upwardly through the interior of said hopper, said hopper being rigidly secured to said outer tubular member for movement therewith, said hopper in the lowermost position thereof depending between said wheels, a pouring spout on the lowermost portion of said hopper, the center of gravity of said hopper being substantially directly above said axle.

7. A truck comprising a frame, a pair of laterally spaced supporting wheels on one end of said frame, a tubular upright member secured at the lower end thereof to said frame, a tubular upright member surrounding said first tubular member, means arranged within said first tubular member for effecting upward telescopic movement of said outer tubular member, a bulk material handling hopper, said tubular members extending upwardly through the interior of said hopper whereby the weight of the hopper and contents is distributed around the axis of said tubular members, said hopper having a sloping bottom, a pouring spout in the lowermost portion of said hopper, said hopper in the lowermost position thereof depending downwardly between said wheels, said hopper in the elevated condition of said tubular members being rotatable about said inner tubular member in positions substantially higher than the uppermost portion of said wheels.

8. A truck comprising a body, a pair of laterally spaced supporting wheels at the forward end of said body, the forward end of said body sloping downwardly to a point adjacent the axle of said wheels, an upright secured at the lower end thereof to said body rearwardly of the foremost end thereof, a second upright telescopically slidable upon said first upright, means for effecting upward telescopic movement of said second upright, a bulk material handling hopper, said uprights extending upwardly through the interior of said hopper, said hopper being rigidly secured to said second upright, the bottom of said hopper sloping downwardly and forwardly, the sloping bottom of said hopper extending substantially coincidentally with the sloping forward end of said truck body whereby the lowermost end of said hopper depends downwardly to a point adjacent the lowermost portion of said body, a pouring spout on the lowermost portion of said hopper, said hopper in the lowered position thereof depending downwardly between said wheels, said hopper in the elevated position thereof being rotatable clear of said wheels.

9. A truck comprising a body, a pair of spaced supporting wheels having an axle extending therebetween, said forward end of said body being supported upon said axle, the forward end of said body sloping forwardly and downwardly to a point relatively closely to said axle, an inner upright member rigidly mounted on said body, an outer upright member surrounding said first upright member in a telescopic relation, an elevating mechanism for effecting upward movement of said outer upright member, a bulk material handling hopper, said upright members extending upwardly through the interior of said hopper, said hopper being rigidly secured to said outer upright member, the bottom of said hopper sloping forwardly and downwardly so that in the lowered condition thereof said hopper bottom conforms generally with the sloping forward end of said truck body, a pouring spout in the lowermost portion of said hopper.

10. A truck comprising a body, a pair of laterally spaced supporting wheels on the forward end of said body, the forward end of said body sloping downwardly to a point adjacent the axis of said wheels, a tubular upright secured at the lower end thereof to said body rearward of the foremost end thereof, an outer tubular member arranged telescopically around said first tubular member, an elevating mechanism arranged within said inner tubular member for effecting elevation of said outer tubular member, a bulk material handling hopper, said tubular members extending upwardly through the interior of said hopper, said hopper being rigidly secured to said outer tubular member, said hopper having an open upper end, the bottom of said hopper sloping downwardly and forwardly substantially coincidental with the sloping forward end of said body, the lowermost end of said hopper in the lowered position thereof depending downwardly between said wheels.

11. A truck comprising a body, a pair of supporting wheels having an axle extending therebetween, the forward end of said body being supported upon said axle, said body including a box-like frame element mounted above said axle, the upper surface of the forward end of said body sloping forwardly and downwardly to a point adjacent said axle, an upright member anchored at the lower end thereof to said box-like frame element, a second upright member telescopically surrounding said first member, a hydraulic elevating means for effecting upward telescopic movement of said outer member, a pump for supplying operating fluid to said hydraulic elevating means, said box-like frame element defining a sump chamber for operating fluid for said elevating means, conduit means connecting said sump chamber and said pump, a hopper secured to said second upright member, said hopper extending rearwardly above the forward end of said truck body, the bottom of said hopper in the lowered position conforming generally with the slope of the forward end of said truck body and depending downwardly between said wheels, and a pouring spout in the lowermost portion of said hopper.

12. A truck comprising a frame, a tubular upright member fixedly secured at the lower end thereof to said frame, an outer tubular member fitted telescopically over said first tubular member, a load handling means fixedly secured to said outer tubular member, and means arranged within said inner tubular upright for effecting upward telscopic movement of said outer tubular member for raising said load handling means, said load handling means in the raised position being laterally stabilized by the interfitting relation of said telescopic tubular members.

13. A truck comprising a frame, load handling means, a pair of telescopic tubes, the inner of said tubes being fixedly secured at the lower end to said truck frame, said load handling means being fixedly mounted on the outer of said tubes, and elevating means arranged within said inner tube for exerting a lifting force against the upper end of said outer tube, the lowermost end of said outer tube in the lowered position thereof engaging with said truck frame thereby providing a firm support for said load handling means.

14. A truck comprising a frame, load handling means, a pair of upright telescopic tubes, the inner of said tubes being secured at the lower end to said truck frame, the outer one of said tubes being secured to said load handling means, elevating means arranged within said inner tube for effecting elevation of said outer tube, said outer tube and load handling means being rotatable about said inner tube in the elevated position of said outer tube, the lowermost end of said outer tube in the lowered position thereof resting directly upon said truck frame.

15. A truck comprising a frame, load handling means, a pair of cylindrical telescopic tubes, the inner of said tubes being secured adjacent the lower end thereof to said truck frame, closure means over the upper end of the outer of said tubes and extending over the corresponding end of said inner tube, said load handling means being rigidly secured to said outer tube for movement therewith, elevating means arranged within said inner tube, said elevating means being secured at the lower end to said frame, said elevating means being independent of said tubes and adapted to engage with the closure means for the upper end of said outer tube for exerting a lifting pressure thereagainst.

16. A truck comprising a frame, load handling means, a pair of cylindrical telescopic tubes, the inner of said tubes being rigidly secured to said truck frame, said load handling means being rigidly secured to the outer of said tubes, a hydraulic lifting means arranged within said inner tube and secured at the lower end to said frame and adapted to engage with the upper end of said outer tube for effecting elevation of said load handling means, said load handling means in the elevated position being laterally stabilized by the interfitting relation of said telescopic tubes.

17. A truck comprising a frame, load handling means, a pair of upright telescopic tubes, the inner of said tubes being rigidly secured adjacent the lower end thereof to said truck frame, said load handling means being rigidly secured to the outer of said tubes, closure means sealing the upper end of said outer tube over the corresponding end of said inner tube, an hydraulic lifting means arranged within said inner tube and spaced from said side walls thereof, the space within said inner tube surrounding said hydraulic lifting means forming a chamber for receiving operating fluid from said hydraulic lifting means.

18. A truck comprising a frame, load handling means, a pair of upright telescopic tubes, said truck frame including a box portion, the inner of said tubes extending into said box frame portion and rigidly secured thereto, said load handling means being rigidly secured to the outer of said tubes, closure means sealing the upper end of said outer tube and extending over the corresponding end of said inner tube, a servo-motor arranged within said inner tube and extending between the base of said box frame portion and the closure means for said outer tube, a pump for supplying operating fluid to said servo-motor for effecting the elevation of said outer tube and said load handling means, the interior of said box frame portion forming a sump chamber for operating fluid, and conduit means communicating between said box chamber and said pump.

19. A truck comprising a frame, load handling means, a pair of upright telescopic tubes, said frame including a box-like portion adjacent one end thereof, the lower end of the inner of said tubes extending into said box frame portion and rigidly secured thereto, said load handling means being rigidly secured to the outer of said tubes for movement therewith, means closing the upper end of said outer tube over the corresponding end of said inner tube, a servo-motor arranged within said inner tube, the base of the cylinder of said servo-motor being secured to the base of said box frame portion, the piston of said servo-motor being adapted to engage with the upper end of said outer tube for effecting the elevation of said outer tube and said load handling means, a pump means for supplying operating fluid to said servo-motor cylinder, bypass openings in the upper portion of said servo-motor cylinder permitting escape of operating fluid therefrom upon said servo-motor piston reaching its upper limit of travel, said servo-motor being spaced from the side walls of said inner tube, openings in the lower end of said inner tube establishing communication between the interior of said box frame portion and the interior of said inner tube, said box frame portion defining a sump chamber for servo-motor operating fluid, and conduit means connecting said sump chamber and said pump.

20. A truck comprising a frame, load handling means, a pair of telescopic upright tubes, said frame including a box-like portion at one end thereof having a top and bottom plate, the lower end portion of the inner of said tubes extending through said top plate and resting upon said bottom plate, said inner tube being rigidly secured to said top and bottom plates, said load handling means being rigidly secured to the outer of said tubes at longitudinally spaced points, servo-motor means arranged within said inner tube between said bottom plate and the upper end of said outer tube, means for supplying operating fluid to said servo-motor to effect elevation of said outer tube and said load handling means.

21. A truck comprising a frame, an operator's space on said frame, a bulk material handling hopper mounted on one end of said frame, means supporting said hopper on said frame for rotation about a vertical axis, a pouring spout on said hopper, closure means for said spout, lever means for operating said closure means extending upwardly adjacent each of the opposite sides of said hopper toward said driver's seat.

22. A truck comprising a frame, an operator's space on said frame, a bulk material handling hopper mounted on one end of said frame, means supporting said hopper on said frame for rotation about a vertical axis, a pouring spout for said hopper, a closure means for said spout, a pair of levers pivotally mounted on each of the opposite sides of said hopper, each of said levers being connected to said closure means, said levers extending rearwardly toward said operator's space whereby said closure means may be controlled from said operator's compartment irrespective of the angular position of said hopper about said axis.

23. A truck comprising a frame, a bulk material handling hopper mounted on one end of said frame, means supporting said hopper on said frame for rotation about a vertical axis, an operator's seat, and means operable from said seat for effecting rotation of said hopper about said axis.

24. A truck having a frame, an upright member secured to the forward end of said frame, an upright member surrounding said first upright member, means for telescopically moving said outer upright member, a hopper rigidly secured to said outer upright member, a pouring spout in the lowermost end of said hopper, a chute pivotally attached to said hopper and movable downwardly for receiving material fed from said spout and conveying material therefrom to a remote point, said chute in the elevated position thereof permitting unrestricted flow of material from said spout.

ELMER A. WAGNER.